(12) United States Patent
Cowlishaw et al.

(10) Patent No.: US 8,667,041 B2
(45) Date of Patent: *Mar. 4, 2014

(54) DETECTION OF POTENTIAL NEED TO USE A LARGER DATA FORMAT IN PERFORMING FLOATING POINT OPERATIONS

(75) Inventors: Michael F Cowlishaw, Coventry (GB); Shawn D Lundvall, Midlothian, VA (US); Ronald M Smith, Wappingers Falls, NY (US); Phil C Yeh, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 119 days.

This patent is subject to a terminal disclaimer.

(21) Appl. No.: 13/103,368

(22) Filed: May 9, 2011

(65) Prior Publication Data
US 2011/0214042 A1   Sep. 1, 2011

Related U.S. Application Data

(63) Continuation of application No. 11/740,165, filed on Apr. 25, 2007.

(51) Int. Cl.
*G06F 7/38* (2006.01)
*G06F 15/00* (2006.01)

(52) U.S. Cl.
USPC .......................................... 708/495; 708/525

(58) Field of Classification Search
USPC .................................. 708/495, 525
See application file for complete search history.

(56) References Cited

U.S. PATENT DOCUMENTS

| | | | |
|---|---|---|---|
| 5,559,977 A | 9/1996 | Avnon et al. |
| 5,696,709 A | 12/1997 | Smith |
| 5,796,641 A | 8/1998 | Tu |
| 5,825,678 A | 10/1998 | Smith |
| 5,889,980 A | 3/1999 | Smith |
| 5,978,901 A | 11/1999 | Luedtke et al. |
| 6,473,807 B1 | 10/2002 | Hills et al. |
| 7,047,401 B2 | 5/2006 | Seal et al. |
| 7,251,811 B2 | 7/2007 | Rosner et al. |
| 7,343,479 B2 | 3/2008 | Knebel et al. |
| 8,051,118 B2 | 11/2011 | Lundvall et al. |
| 8,051,119 B2 | 11/2011 | Lundvall et al. |
| 8,060,545 B2 | 11/2011 | Lundvall et al. |
| 8,082,282 B2 | 12/2011 | Lundvall et al. |
| 2005/0065990 A1 | 3/2005 | Allen |
| 2007/0022152 A1 | 1/2007 | Gerwig et al. |
| 2007/0061387 A1 | 3/2007 | Carlough et al. |
| 2008/0215659 A1 | 9/2008 | Cowlishaw et al. |
| 2008/0270508 A1 | 10/2008 | Lundvall et al. |
| 2009/0094441 A1 | 4/2009 | Hack et al. |
| 2011/0214042 A1 | 9/2011 | Lundvall et al. |

OTHER PUBLICATIONS

Intel 64 and IA-32 Architectures Software Developers Manual, vol. 1: Basic Architecture 253665-022US, Nov. 2006.

(Continued)

*Primary Examiner* — Chuong D Ngo
(74) *Attorney, Agent, or Firm* — Dennis Jung

(57) ABSTRACT

Detection of whether a result of a floating point operation is safe. Characteristics of the result are examined to determine whether the result is safe or potentially unsafe, as defined by the user. An instruction is provided to facilitate detection of safe or potentially unsafe results.

11 Claims, 10 Drawing Sheets

(56) References Cited

OTHER PUBLICATIONS

Intel 64 and IA-32 Architectures Software Developers Manual, vol. 2A: Instruction Set Reference, A-M, 253666-022US, Nov. 2006.

Intel Itanium Architecture Software Developers Manual, vol. 1: Application Architecture, Revision 2.2, Jan. 2006, Document No. 245317-005.

Intel Itanium Architecture Software Developers Manual, vol. 2: System Architecture, Revision 2.2, Jan. 2006, Document No. 245318-005.

Intel Itanium Architecture Software Developers Manual, vol. 3: Instruction Set Reference, Revision 2.2, Jan. 2006, Document No. 245319-005.

DRAFT Standard for Floating Point Arithmetic P754, Draft 1.3.0, Feb. 23, 2007.

z/Architecture—Principles of Operation, Sixth Edition, SA22-7832-05, Apr. 2007.

z/Architecture—Preliminary Decimal Floating Point Architecture, SA23-2232-00, Nov. 2006.

IEEE Standard for Binary Floating-Point Arithmetic, IEEE Std, 754-1985.

IEEE Standard for Radix Independent Floating Point Arithmetic, IEEE Std 854-1987.

Densely Packed Decimal Encodingm, Mike Cowlishaw, IEEE Proceedings—Computer and Digital Techniques, ISSN 1350-2387, vol. 149, No. 3, pp. 102-104, IEEE, May 2002 (Abstract only).

A Summary of Densely Packed Decimal Encoding, www.2.hursley.ibm.com/decimal/DPDecimal.html, 5 pps. 2007.

PowerPC User Instruction Set Architecture, Book 1, Version 2.01, Sep. 2003.

"Perform Floating Point Operation", Chapter 9, Floating Point Overview and Support Instructions, pp. 9-31, 9-40, 2007.

U.S. Appl. No. 11/868,605, Notice of Allowance mailed Jun. 18, 2012.

U.S. Appl. No. 11/868,605, Notice of Allowance mailed Feb. 22, 2012.

U.S. Appl. No. 11/868,605, Non-final Office Action mailed Nov. 30, 2011.

U.S. Appl. No. 11/868,605, Final Office Action mailed May 6, 2010.

U.S. Appl. No. 11/868,605, Non-final Office Action mailed Nov. 9, 2009.

U.S. Appl. No. 11/740,165, Notice of Allowance mailed Sep. 22, 2010.

U.S. Appl. No. 11/740,165, Notice of Allowance mailed Jan. 19, 2011.

U.S. Appl. No. 11/740,165, Issue Notification mailed May 11, 2011.

U.S. Appl. No. 11/740,165, Petition to Withdraw from Issue Granted, mailed May 27, 2011.

U.S. Appl. No. 11/740,165, Notice of Allowance mailed Oct. 3, 2011.

U.S. Appl. No. 11/740,165, Notice of Allowance mailed May 23, 2012.

IBM z/Architecture Principles of Operation, SA22-7832-01, Second Edition, Oct. 2001. This earlier version of the subject document is being submitted for additional consideration. For example, examiner is directed to pp. 7-115 to 7-130 with respect to the clearly distinguishable PLO instruction.

| BITS 12345 | BIT 6 | TYPE | BIASED EXPONENT | LMD |
|---|---|---|---|---|
| 00000 | m | FINITE NUMBER | 00 \| RBE | 0 |
| 00001 | m | FINITE NUMBER | 00 \| RBE | 1 |
| 00010 | m | FINITE NUMBER | 00 \| RBE | 2 |
| 00011 | m | FINITE NUMBER | 00 \| RBE | 3 |
| 00100 | m | FINITE NUMBER | 00 \| RBE | 4 |
| 00101 | m | FINITE NUMBER | 00 \| RBE | 5 |
| 00110 | m | FINITE NUMBER | 00 \| RBE | 6 |
| 00111 | m | FINITE NUMBER | 00 \| RBE | 7 |
| 01000 | m | FINITE NUMBER | 01 \| RBE | 0 |
| 01001 | m | FINITE NUMBER | 01 \| RBE | 1 |
| 01010 | m | FINITE NUMBER | 01 \| RBE | 2 |
| 01011 | m | FINITE NUMBER | 01 \| RBE | 3 |
| 01100 | m | FINITE NUMBER | 01 \| RBE | 4 |
| 01101 | m | FINITE NUMBER | 01 \| RBE | 5 |
| 01110 | m | FINITE NUMBER | 01 \| RBE | 6 |
| 01111 | m | FINITE NUMBER | 01 \| RBE | 7 |
| 10000 | m | FINITE NUMBER | 10 \| RBE | 0 |
| 10001 | m | FINITE NUMBER | 10 \| RBE | 1 |
| 10010 | m | FINITE NUMBER | 10 \| RBE | 2 |
| 10011 | m | FINITE NUMBER | 10 \| RBE | 3 |
| 10100 | m | FINITE NUMBER | 10 \| RBE | 4 |
| 10101 | m | FINITE NUMBER | 10 \| RBE | 5 |
| 10110 | m | FINITE NUMBER | 10 \| RBE | 6 |
| 10111 | m | FINITE NUMBER | 10 \| RBE | 7 |
| 11000 | m | FINITE NUMBER | 00 \| RBE | 8 |
| 11001 | m | FINITE NUMBER | 00 \| RBE | 9 |
| 11010 | m | FINITE NUMBER | 01 \| RBE | 8 |
| 11011 | m | FINITE NUMBER | 01 \| RBE | 9 |
| 11100 | m | FINITE NUMBER | 10 \| RBE | 8 |
| 11101 | m | FINITE NUMBER | 10 \| RBE | 9 |
| 11110 | r | INFINTY[1] | – | – |
| 11111 | 0 | QNaN[2] | – | – |
| 11111 | 1 | SNaN[2] | – | – | fig. 2A

| | |
|---|---|
| EXPLANATION: | |
| — | NOT APPLICABLE |
| \| | CONCATENATION |
| 1 | ALL BITS IN THE COMBINATION FIELD TO THE RIGHT OF BIT 5 OF THE FORMAT CONSTITUTE THE RESERVED FIELD FOR INFINITY. |
| 2 | ALL BITS IN THE COMBINATION FIELD TO THE RIGHT OF BIT 6 OF THE FORMAT CONSTITUTE THE RESERVED FIELD FOR NaN. |
| LMD | LEFTMOST DIGIT OF THE SIGNIFICAND. |
| m | BIT 6 IS A PART OF THE REMAINING BIASED EXPONENT. |
| RBE | REMAINING BIASED EXPONENT. IT INCLUDES ALL BITS IN THE COMBINATION FIELD TO THE RIGHT OF BIT 5 OF THE FORMAT. |
| r | BIT 6 IS A RESERVED BIT FOR INFINITY. |

*fig. 2B*

| FORMAT | VALUE | |
|---|---|---|
| | LEFT-UNITS VIEW | RIGHT-UNITS VIEW |
| SHORT | $\pm 10^{e-95} \times (d_0.d_1d_2...d_6)$ | $\pm 10^{e-101} \times (d_0d_1d_2...d_6)$ |
| LONG | $\pm 10^{e-383} \times (d_0.d_1d_2...d_{15})$ | $\pm 10^{e-398} \times (d_0d_1d_2...d_{15})$ |
| EXTENDED | $\pm 10^{e-6143} \times (d_0.d_1d_2...d_{33})$ | $\pm 10^{e-6176} \times (d_0d_1d_2...d_{33})$ |

EXPLANATION:

$d_0.d_1d_2...d_{p-1}$ SIGNIFICAND IN LEFT-UNITS VIEW. THE DECIMAL POINT IS TO THE IMMEDIATE RIGHT OF THE LEFTMOST DIGIT AND $d_i$ IS A DECIMAL DIGIT, WHERE $0 \leq i \leq (p-1)$ AND p IS THE FORMAT PRECISION.

$d_0d_1d_2...d_{p-1}$ SIGNIFICAND IN RIGHT-UNITS VIEW. THE DECIMAL POINT IS TO THE RIGHT OF THE RIGHTMOST DIGIT AND $d_i$ IS A DECIMAL DIGIT, WHERE $0 \leq i \leq (p-1)$ IS THE FORMAT PRECISION.

$e$ BIASED EXPONENT.

fig. 3

| | PROPERTY | FORMAT | | |
|---|---|---|---|---|
| | | SHORT | LONG | EXTENDED |
| 404 | FORMAT LENGTH (BITS) | 32 | 64 | 128 |
| 406 | COMBINATION LENGTH (BITS) | 11 | 13 | 17 |
| 408 | ENCODED TRAILING SIGNIFICAND LENGTH (BITS) | 20 | 50 | 110 |
| 410 | PRECISION (p) | 7 | 16 | 34 |
| 412 | MAXIMUM LEFT-UNITS-VIEW (LUV) EXPONENT (Emax) | 96 | 384 | 6144 |
| 414 | MINIMUM LEFT-UNITS-VIEW (LUV) EXPONENT (Emin) | −95 | −383 | −6143 |
| 416 | LEFT UNITS-VIEW (LUV) BIAS | 95 | 383 | 6143 |
| 418 | MAXIMUM RIGHT-UNITS-VIEW (RUV) EXPONENT (Qmax) | 90 | 369 | 6111 |
| 420 | MINIMUM RIGHT-UNITS-VIEW (RUV) EXPONENT (Qmin) | −101 | −398 | −6176 |
| 422 | RIGHT-UNITS-VIEW (RUV) BIAS | 101 | 398 | 6176 |
| 424 | MAXIMUM BIASED EXPONENT | 191 | 767 | 12,287 |
| 426 | Nmax, LARGEST (IN MAGNITUDE) NORMAL NUMBER | $(10^7-1) \times 10^{90}$ | $(10^{16}-1) \times 10^{369}$ | $(10^{34}-1) \times 10^{6111}$ |
| 428 | Nmin, SMALLEST (IN MAGNITUDE) NORMAL NUMBER | $1 \times 10^{-95}$ | $1 \times 10^{-383}$ | $1 \times 10^{-6143}$ |
| 430 | Dmin, SMALLEST (IN MAGNITUDE) SUBNORMAL NUMBER | $1 \times 10^{-101}$ | $1 \times 10^{-398}$ | $1 \times 10^{-6176}$ | fig. 4

| | 500 | 502 | 504 |
|---|---|---|---|
| 506 DATA CLASS | SIGN | MAGNITUDE |
| 508 ZERO | ± | 0* |
| SUBNORMAL | ± | $0 < |X| < N_{min}$ |
| NORMAL | ± | $N_{min} \leq |Y| \leq N_{max}$ |
| 510 EXPLANATION: *THE COEFFICIENT IS ZERO AND THE EXPONENT IS ANY REPRESENTABLE VALUE | | |

| | 600 | 602 | 604 | 606 |
|---|---|---|---|---|
| 610 DATA CLASS | SIGN | BITS 1-5 | REMAINING BITS IN COMBINATION FIELD |
| 612 INFINITY | ± | 11110 | XXX ... XXX |
| QUIET NaN | ± | 11111 | 0XX ... XXX |
| 614 SIGNALING NaN | ± | 11111 | 1XX ... XXX |

DETECTION OF POTENTIAL NEED TO USE A LARGER DATA FORMAT IN PERFORMING FLOATING POINT OPERATIONS

CROSS REFERENCE TO RELATED APPLICATION

This application is a continuation of co-pending U.S. patent application Ser. No. 11/740,165 filed Apr. 25, 2007, entitled "DETECTION OF POTENTIAL NEED TO USE A LARGER DATA FORMAT IN PERFORMING FLOATING POINT OPERATIONS," the entirety of which is hereby incorporated herein by reference.

TECHNICAL FIELD

This invention relates, in general, to facilitating processing within a processing environment, and in particular, to managing processing associated with floating point operations, including decimal floating point operations.

BACKGROUND OF THE INVENTION

Floating point is used to represent real numbers on computers. There are different types of floating point arithmetic, including binary floating point and decimal floating point, as examples. Floating point numbers are discussed in IEEE STD 754-1985, IEEE Standard For Binary Floating-Point Arithmetic; and in IEEE STD 854-1987, IEEE Standard for Radix-Independent Floating-Point Arithmetic, which are hereby incorporated herein by reference in their entirety.

Binary floating point numbers are represented in computer hardware as base two (binary) fractions. While binary floating point has been very valuable over the years, there are some limitations with binary floating point operations. For instance, binary floating point cannot represent some decimal fractions, such as 0.1; and the scaling of binary floating point requires rounding. Due to the limitations of binary floating point, decimal floating point has evolved for use in computational processing in computers and other processing environments.

Decimal floating point is easier to comprehend, since decimal data is the most common of all numeric data. A decimal floating point finite number includes a sign bit, an exponent and a significand. The sign bit is zero for plus and one for minus. The exponent, a signed value, is represented as an unsigned binary value by adding a bias, resulting in a biased exponent. The significand includes a string of decimal digits, where each digit is an integral value between zero and one less than the radix (i.e., 10 is the radix for decimal). The number of digit positions in the significand is called the precision of the floating point number.

The numerical value of a decimal floating point finite number is represented as $(1)^{sign} \times significand \times 10^{exponent}$. The value of $1 \times 10^{exponent}$ is called the quantum.

SUMMARY OF THE INVENTION

For each decimal floating point arithmetic operation, a value and quantum are defined for the result. Certain applications, such as Java 1.1 Big Decimal, depend on a safe result being delivered. In one embodiment, a result of a floating point operation is considered safe, if the operation that produced the result would produce the same result (i.e., value and quantum) if it used a larger data format.

Since there are applications that depend on a safe result, a need exists for a capability that facilitates a determination of whether a result produced from a floating point operation, such as a decimal floating point operation, is safe. As one example, a need exists for an instruction that is capable of facilitating detection of a safe result or a potentially unsafe result.

The shortcomings of the prior art are overcome and additional advantages are provided through the provision of an article of manufacture that includes at least one computer usable medium having computer readable program code logic to execute a machine instruction. The computer readable program code logic when executing performing, for instance, the following: obtaining a machine instruction for execution, the machine instruction being defined for computer execution according to a computer architecture, the machine instruction comprising an opcode, a register field, an index field, a base field and a displacement value; and performing a function defined by the opcode of the machine instruction of determining whether a first operand included in a register specified by the register field is a safe decimal floating point number or is a potentially unsafe decimal floating point number. The function including determining a data group and a sign for the first operand; determining a plurality of second operand bits using the index field, base field and displacement value of the machine instruction, each bit of the plurality of second operand bits corresponding to a data group and sign combination; selecting a bit of the plurality of second operand bits based on the data group and sign determined for the first operand; determining a value of the selected bit; and setting a condition code based on the value of the selected bit, wherein the condition code indicates whether a result of a floating point operation is safe or potentially unsafe.

Methods and systems relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 2A-2B depict one example of the encoding and layout of the combination field of FIGS. 1A-1C, in accordance with an aspect of the present invention;

FIG. 3 depicts examples of values of finite numbers in the various formats of FIGS. 1A-1C, in accordance with an aspect of the present invention;

FIG. 4 depicts one example of various properties of the three decimal floating point formats of FIGS. 1A-1C, in accordance with an aspect of the present invention;

DETAILED DESCRIPTION OF THE INVENTION

Figure 1A:
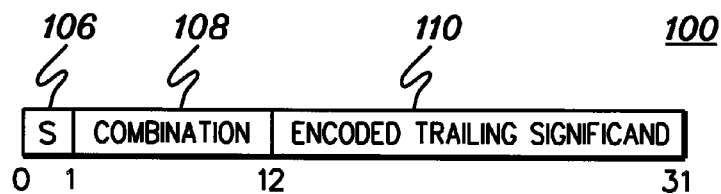
FIG. 1A depicts one embodiment of a short data format of a decimal floating point number, in accordance with an aspect of the present invention.

In accordance with an aspect of the present invention, a capability is provided for facilitating a determination of whether a value produced as a result of a floating point operation is safe. In one embodiment, a result of a decimal floating point (DFP) operation is safe if the same result (i.e., same value and quantum) would be produced, if the decimal floating point operation used a larger data format.

To detect whether a result is safe, certain characteristics of the result are examined, as explained further below. If the characteristics are evident in the result, then the result is safe. However, if the characteristics are not present in the result, then the result is potentially unsafe. To clearly determine whether the result is unsafe, in one example, the operation could be performed using the larger data format. If a value or quantum is produced that is different from the previous value or quantum, then the previous result is unsafe.

A decimal floating point finite number includes three components: a sign bit, an exponent, and a significand. The magnitude (an unsigned value) of the number is the product of the significand and the radix (10 for DFP) raised to the power of the exponent. The number is positive or negative depending on whether the sign bit is zero or one, respectively.

The significand has an implied radix point, and its position depends on which interpretation of the floating point datum is being applied. This interpretation is called a view. There are multiple views that can be applied to a floating point format, and each view is an interpretation of the meaning of the fields in a floating point datum, and an implied radix point. Examples of the multiple views include a fraction view, a left units view and a right units view. With the fraction view, the radix point is implied to be to the left of the leftmost digit of the significand. With the left units view, the leftmost digit of the significand is assumed to be the units digit and the radix point is implied to be immediately to the right of this digit. With the right units view, the rightmost digit of the significand is assumed to be the units digit and the radix point is implied to be immediately to the right of the entire significand. Although all three views can be applied to a floating point format, in the examples described herein, the right units view is applied to DFP, unless otherwise noted. Thus, for the significand, the implied radix point is immediately to the right of the significand.

The use of different views has an affect on the definition of unbiased exponent and the bias. The value of the floating point number is defined to be the product of the significand times the base raised to the power of the unbiased exponent. Since different views place the assumed radix point at different positions in the significand, to keep the value the same, the unbiased exponent is to change by a corresponding amount, and the bias to convert between the biased exponent and the unbiased exponent is to change. This results in different exponent and bias terms including: fraction view exponent, left units view (LUV) exponent, right units view (RUV) exponent, fraction view bias, left units view bias and right units view bias.

The representation of decimal floating point finite numbers allows leading zeros and trailing zeros in the significand. This allows some numbers to have multiple representations. Each representation has a different combination of significand and exponent. For example, $1000000 \times 10^5$ and $10 \times 10^{10}$ are two different representations of the same number. This number representation carries information about both the numerical value and the quantum of a decimal floating point finite number. The set of different representations of a decimal floating point number using the same sign is called a cohort. Each of these multiple representations is called a cohort member. A plus zero and a minus zero have the same value, but are in different cohorts.

For a DFP finite number, the magnitude of a value of one in the rightmost digit position of the significand is called the quantum. Each cohort member of a cohort uses a different quantum to represent the same value. The quantum of a cohort member is the same, regardless of whether the left units view or right units view is taken.

For operations that produce a DFP result, a quantum, called the preferred quantum, is defined to select a cohort member to represent the delivered value, if it is a finite number. The preferred quanta for these operations are depicted in the below table. When the delivered value is exact, the preferred quantum depends on the operation. When the delivered value is inexact, the preferred quantum is the smallest quantum, unless otherwise stated.

In the absence of a trap overflow or trap underflow, if the delivered value is a finite number, the cohort member with the quantum closest to the preferred quantum is selected.

In the case of a trap overflow or trap underflow, the cohort member with the quantum closest to the scaled preferred quantum is selected. The scaled preferred quantum is obtained by scaling the preferred quantum using the same scale factor that was used to obtain the delivered value.

Examples of preferred quantum for various operations are depicted below.

| Operations | Delivered Value | Preferred Quanta |
|---|---|---|
| ADD | Exact | The smaller quantum of the two source operands† |
|  | Inexact | The smallest quantum |
| CONVERT FROM FIXED | Exact | One† |
|  | Inexact | The smallest quantum |

-continued

| Operations | Delivered Value | Preferred Quanta |
|---|---|---|
| CONVERT FROM SIGNED PACKED | — | One |
| CONVERT FROM UNSIGNED PACKED | — | One |
| DIVIDE | Exact | The quantum of the dividend divided by the quantum of the divisor† |
| | Inexact | The smallest quantum |
| INSERT BIASED EXPONENT | — | The quantum corresponds to the requested biased exponent |
| LOAD AND TEST | — | The quantum of the source operand |
| LOAD FP INTEGER | Exact | The larger value of one and the quantum of the source operand |
| | Inexact | One |
| LOAD LENGTHENED | Exact | The quantum of the source operand† |
| | Inexact | The smallest quantum |
| LOAD ROUNDED | Exact | The quantum of the source operand† |
| | Inexact | The smallest quantum |
| PERFORM FLOATING POINT OPERATION (DPQC = 0) | Exact | The largest quantum† |
| | Inexact | The smallest quantum |
| PERFORM FLOATING POINT OPERATION (DPQC = 1) | Exact | One† |
| | Inexact | The smallest quantum |
| MULTIPLY | Exact | The product of the quanta of the two source operands† |
| | Inexact | The smallest quantum |
| QUANTIZE | Exact | The requested quantum |
| | Inexact | The requested quantum |
| REROUND | Exact | The larger value of the quantum that corresponds to the requested significance and the quantum of the source operand |
| | Inexact | The quantum that corresponds to the requested significance |
| SHIFT SIGNIFICAND LEFT | — | The quantum of the source operand |
| SHIFT SIGNIFICAND RIGHT | — | The quantum of the source operand |
| SUBTRACT | Exact | The smaller quantum of the two source operands† |
| | Inexact | The smallest quantum |

Explanation:
— For these operations, the concept of exact result or inexact result does not apply.
†If the delivered value cannot be represented with the preferred quantum, it is represented with the quantum closest to the preferred quantum.
DPQC DFP preferred quantum control.

Decimal floating point numbers may be represented in any of three data formats: short, long, or extended. As examples, the short format includes 32 bits, the long format 64 bits, and the extended format 128 bits.

NaNs (Not a Number) may also be represented in any of the three data formats. A NaN is a value or symbol that is usually produced as a result of an operation on invalid operands. There are quiet NaNs and signaling NaNs. A quiet NaN, in most instances, does not raise any additional exceptions as it propagates through operations, such as decimal floating point operations. On the other hand, a signaling NaN does raise additional exceptions.

Figure 1B:
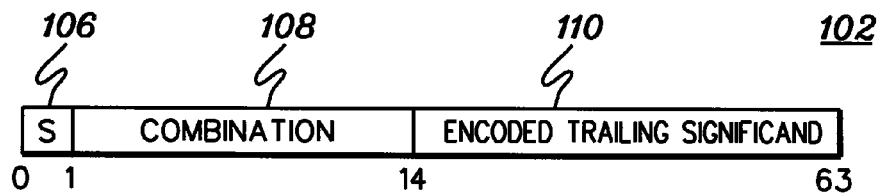
FIG. 1B depicts one embodiment of a long data format of a decimal floating point number, in accordance with an aspect of the present invention.
Figure 1C:
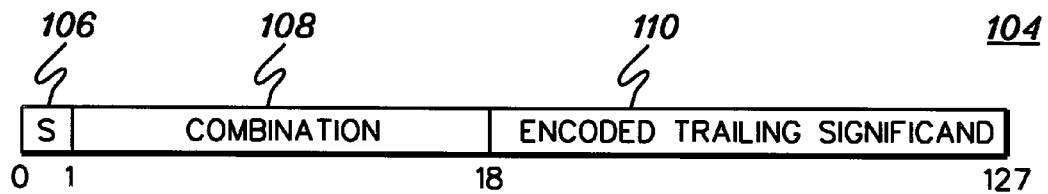
FIG. 1C depicts one embodiment of an extended data format of a decimal floating point number, in accordance with an aspect of the present invention.

The contents of each data format represent encoded information. Special codes are assigned to NaNs and infinities. Examples of the formats are described with reference to FIGS. 1A-1C. For instance, FIG. 1A depicts one example of a short data format representation 100 of a decimal floating point number; FIG. 1B depicts one example of a long data format representation 102 of a decimal floating point number; and FIG. 1C depicts one embodiment of an extended data format representation 104 of a decimal floating point number.

Each data format is of a different length, but has the same fields. The fields include, for instance, the following:

A sign field (S) 106 represents the sign bit of the decimal floating point number. In one example, it is bit 0 in each format, and is set to zero for plus and one for minus;

A combination field 108: For finite numbers, this field includes the biased exponent and the leftmost digit of the significand; for NaNs and infinities, this field includes codes to identify them.

When bits 1-5 of the format are in the range of 00000-11101, the operand is a finite number. The two leftmost bits of the biased exponent and the leftmost digit of the significand are encoded in bits 1-5 of the format. Bit 6 through the end of the combination field includes the rest of the biased exponent.

When bits 1-5 of the format field are 11110, the operand is an infinity. All bits in the combination field to the right of bit 5 of the format constitute the reserved field for infinity. A nonzero value in the reserved field is accepted in a source infinity; the reserved field is set to zero in a resultant infinity.

When bits 1-5 of the format are 11111, the operand is a NaN and bit 6, called the SNaN bit, further distinguishes QNaN from SNaN. If bit 6 is zero, then it is QNaN; otherwise, it is SNaN. All bits in the combination field to the right of bit 6 of the format constitute the reserved field for NaN. A nonzero value in the reserved field is accepted in a source NaN; the reserved field is set to zero in a resultant NaN.

FIGS. 2A-2B summarize the encoding and layout of the combination field. In the figures, the biased exponent of a finite number is the concatenation of two parts: (1) two leftmost bits are derived from bits 1-5 of the format, and (2) the remaining bits in the combination field. For example, if the combination field of the DFP short format includes 10101010101 binary, it represents a biased exponent of 10010101 binary and a leftmost significant digit of 5.

An encoded trailing significand 110 (FIGS. 1A-1C): This field includes an encoded decimal number, which represents digits in the trailing significand. The trailing significand includes all significand digits, except the leftmost digit. For infinities, nonzero trailing significand digits are accepted in a source infinity; all trailing significand digits in a resultant infinity are set to zeros, unless otherwise stated. For NaNs, this field includes diagnostic information called the payload.

In one example, the trailing significand digits in a DFP data format are encoded by representing three decimal digits with a 10-bit declet. The digits in the trailing significand are encoded using densely packed decimal encoding. Examples of densely packed decimal encoding are described in "A Summary of Densely Packed Decimal Encoding," Mike Cowlishaw, Jul. 16, 2005, www2.hursley.ibm.com/decimal/DPDecimal.html, and "Densely Packed Decimal Encoding," Mike Cowlishaw, IEEE Proceedings—Computers and Digital Techniques, ISSN 1350-2387, Vol. 149, No. 3, pp. 102-104, IEEE, May 2002, each of which is hereby incorporated herein by reference in its entirety.

Each of the three data formats has different values of finite numbers. Examples of these values in the various formats are shown in FIG. 3. As depicted, values are provided for both the left units view 300 and right units view 302 for each format, including the short format 304, long format 306 and extended format 308.

Each of the three data formats for decimal floating point numbers has properties associated therewith. These properties are summarized in FIG. 4. As depicted, properties 400 include for each format 402 the following, as examples: format length 404, combination length 406, encoded trailing significand length 408, precision 410, maximum left units view (LUV) exponent ($E_{max}$) 412, minimum left units view exponent ($E_{min}$) 414, left units view bias 416, maximum right units view (RUV) exponent ($Q_{max}$) 418, minimum right units view exponent ($Q_{min}$) 420, right units view bias 422, maximum biased exponent 424, largest (in magnitude) normal number ($N_{max}$) 426, smallest (in magnitude) normal number ($N_{min}$) 428, and smallest (in magnitude) subnormal number ($D_{rain}$) 430.

In addition to the above, decimal floating point data is categorized into six classes of data, including zero, subnormal number, normal number, infinity, signaling NaN and quiet NaN data classes. The value of a decimal floating point finite number, including zero, subnormal number, and normal number, is a quantization of the real number based on the data format. The value ranges for finite number data classes are depicted in FIG. 5, and the codes for NaNs and infinity are depicted in FIG. 6.

Figures 5, 6, 7:
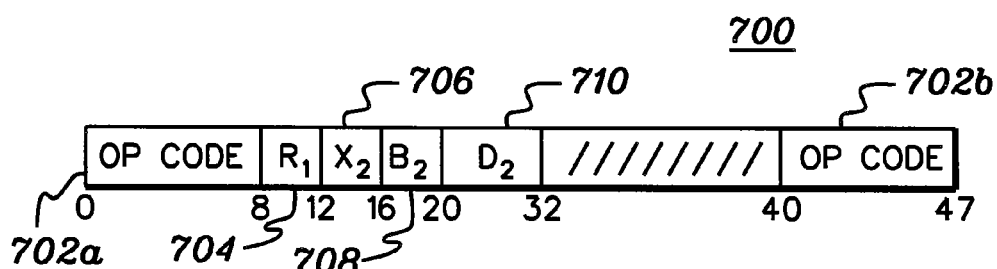
FIG. 5 depicts one embodiment of value ranges for finite number data classes of decimal floating point data, in accordance with an aspect of the present invention.
FIG. 6 depicts one example of the encoding of not a number (NaNs) and infinity data classes of decimal floating point data, in accordance with an aspect of the present invention.
FIG. 7 depicts one embodiment of a format of a Test Data Group instruction used in accordance with an aspect of the present invention.

For instance, FIG. 5 shows a sign 502 and a magnitude 504 for each data class 500, including zero data class 506, subnormal data class 508, and normal data class 510. As shown, a subnormal number has a value smaller than $N_{min}$ (smallest normal number) and greater than zero in magnitude. A normal number is a nonzero finite number whose magnitude is between $N_{min}$ and $N_{max}$ (largest normal number) inclusively.

Similarly, FIG. 6 shows, in one embodiment, a sign 602, an encoding of bits 1-5 of the combination field, and an encoding of the remaining bits of the combination field 606 of the data format for each data class 600, including infinity data class 610, quiet NaN data class 612, and signaling NaN data class 614.

As part of a decimal floating point operation, in which the source operands are finite numbers, a precise intermediate value is first produced, which is the value that would have been computed if both the precision and exponent range were unbounded. Then, a rounded intermediate value is produced. That is, except when otherwise specified, the precise intermediate value is rounded to the precision of the target format, but with unbounded exponent range. This process is called target precision constrained rounding, and the value selected by this type of rounding is called the precision rounded value.

For IEEE targets, when the IEEE underflow trap is disabled and the tininess condition exists, the precise intermediate value is rounded to fit in the destination format. That is, with both precision and exponent range of the target format. This process is called denormalization rounding and the value selected by this type of rounding is called the denormalized value.

In other examples, a source operand is taken and modified to fit in a subset of the destination format. This process is called functionally constrained rounding and the value selected by this type of rounding is called the functionally rounded value.

In any particular instance, only one of the three rounding processes is performed and the value selected (precision rounded value, denormalized value, or functionally rounded value) is generically referred to as the rounded intermediate value.

In the absence of trapped overflow and trapped underflow, the rounded intermediate value is used as the delivered value. For trapped overflow and trapped underflow, the rounded intermediate value is divided by a scale factor to produce a scaled value, which is used as the delivered value.

Since the decimal floating point data format is highly encoded, it is not easy for a program to test a decimal floating point number for extreme exponent or zero leftmost significand digit to determine whether the number is safe to use. Thus, in accordance with an aspect of the present invention, an instruction, referred to herein as Test Data Group, is provided to facilitate a determination of whether a finite number is safe. A finite number is safe, in this example, if the exponent is neither maximum nor minimum (i.e., not extreme), and the leftmost significand digit is zero.

The Test Data Group instruction is executed in response to, for instance, a request by a user application. As an example, an application performs (or has performed for it) a decimal floating point operation, which produces a result. The application would like to know if the result is safe. Thus, the application initiates execution of the Test Data Group instruction. The Test Data Group instruction determines whether the result is safe, based on user defined characteristics, and provides a result to the application. The application takes action (e.g., continues mainline processing, branches, terminates, etc.) based on the result of the instruction.

The Test Data Group instruction can be implemented in many architectures and may be emulated. As examples, the instruction is executed in hardware by a processor; by software executing on a processor having a native instruction set; or by emulation of a non-native instruction set that includes this instruction. In one particular example, the instruction is implemented in the z/Architecture®, offered by International Business Machines Corporation, Armonk, N.Y. z/Architecture® is a registered trademark of International Business Machines Corporation, Armonk, N.Y., U.S.A. Other names used herein may be registered trademarks, trademarks or product names of International Business Machines Corporation or other companies. One embodiment of the z/Architecture is described in "z/Architecture Principles of Operation," IBM Publication No. SA22-7832-05, 6$^{th}$ Edition, April 2007, which is hereby incorporated herein by reference in its entirety and which shows one example of the Test Data Group instruction. Further, one example of the Test Data Group instruction, as well as additional details relating to decimal floating point, and in particular, a decimal floating point architecture offered by International Business Machines Corporation are described in an IBM® publication entitled "Preliminary Decimal-Floating Point Architecture," Publication No. SA23-2232-00, November 2006, which is hereby incorporated herein by reference in its entirety.

One example of a format of the Test Data Group instruction is described with reference to FIG. 7. In one example, a Test Data Group instruction 700 is a 48 bit instruction in format RXE (register and indexed storage operation having an extended opcode field) as that format is defined in the IBM® z/Architecture Principles of Operation. It includes, for instance:

An operation code 702a (e.g., bits 0-7), 702b (e.g., bits 40-47) designating the Test Data Group instruction. In this example, there are three possible operation codes: one for each data format.

A register field 704 (e.g., $R_1$, bits 8-11) designating a floating point register, the contents of which are a first operand used by the instruction.

An index field 706 (e.g., $X_2$, bits 13-15) designating a general register having, for instance, a 64-bit number.

A base field 708 (e.g., $B_2$, bits 17-19) designating a general register having, for instance, a 64-bit number.

A displacement value 710 having, for instance a 12-bit number.

The contents of the general registers specified in fields 706 and 708, if any, are added to the contents of displacement value 710 to form a second operand address as defined for an RXE format instruction in the IBM® z/Architecture Principles of Operations. According to the examples of the Test Data Group instruction described herein, the second operand address is not used as the address of a data location in memory; however, instead, in this example, the rightmost 12 bits of the "address" (e.g., bits 52-63) are used to specify 12 combinations of data group and sign, as described below. The other bits are ignored.

In accordance with an aspect of the present invention, there are a plurality of groups for a decimal floating point entity. These groups are chosen based at least in part on whether the significand or exponent is at the limit of the format. In this example, the data is divided into six possible groups for a decimal floating point entity: (1) safe zero—finite number with zero significand and non-extreme exponent; (2) zero with extreme exponent—finite number with zero significand and extreme exponent; (3) nonzero with extreme exponent—finite number with nonzero significand and extreme exponent; (4) safe nonzero—finite number with nonzero significand, nonextreme exponent and leftmost zero digit in significand, (5) nonzero leftmost significand digit with non-extreme exponent—finite number with nonzero significand, non-extreme exponent and leftmost nonzero digit in significand, and (6) special symbol (e.g., infinity, NaN). There are also two signs: plus (0) and minus (1) for each group.

Although in the above example, there are six groups, in other examples there may be more or less groups and the groups can be based on other criteria.

Each possible combination of group and sign is associated with a bit in the second operand address. Examples of such assignments are depicted below:

| First-Operand Characteristics | | | | | |
| --- | --- | --- | --- | --- | --- |
| | | | | Bit used when sign is | |
| DFP Operand | Exponent | LMD | Data Group | + | − |
| Zero | Nonextreme | $z^1$ | Safe Zero | 52 | 53 |
| | Extreme | $z^1$ | Zero with extreme exponent | 54 | 55 |
| Nonzero finite | Extreme | — | Nonzero with extreme exponent | 56 | 57 |
| | Nonextreme | z | Safe nonzero | 58 | 59 |
| | Nonextreme | nz | Nonzero leftmost significand digit with nonextreme exponent | 60 | 61 |
| Infinity or NaN | na | na | Special | 62 | 63 |

Explanation:
— The result does not depend on this condition.
[1]This condition is true by virtue of the condition to the left of this column.
Extreme Maximum right units view (RUV) exponent, $Q_{max}$, or minimum right units view (RUV) exponent, $Q_{min}$.
Nonextreme $Q_{max}$ < right units view (RUV) exponent < $Q_{min}$.
LMD Leftmost significand digit.
na Not applicable.
nz Nonzero.
z Zero.

Depending on the model, subnormal with nonextreme exponent may be placed in the nonzero with extreme exponent group or the safe nonzero group.

During execution of the Test Data Group instruction, the data group and sign of the first operand are determined and used to select a bit from the second operand address. Condition code zero or one is then set according to whether the selected bit is zero or one, respectively. As examples, if Group 1, sign +, is determined for the first operand of the instruction, then bit 52 of the second operand address is selected to be examined. Similarly, if Group 2, sign −, is determined for the first operand of the instruction, then bit 55 of the second operand address is selected to be examined, etc. This processing is described further below with reference to FIGS. 8A-8B.

Figure 8A:
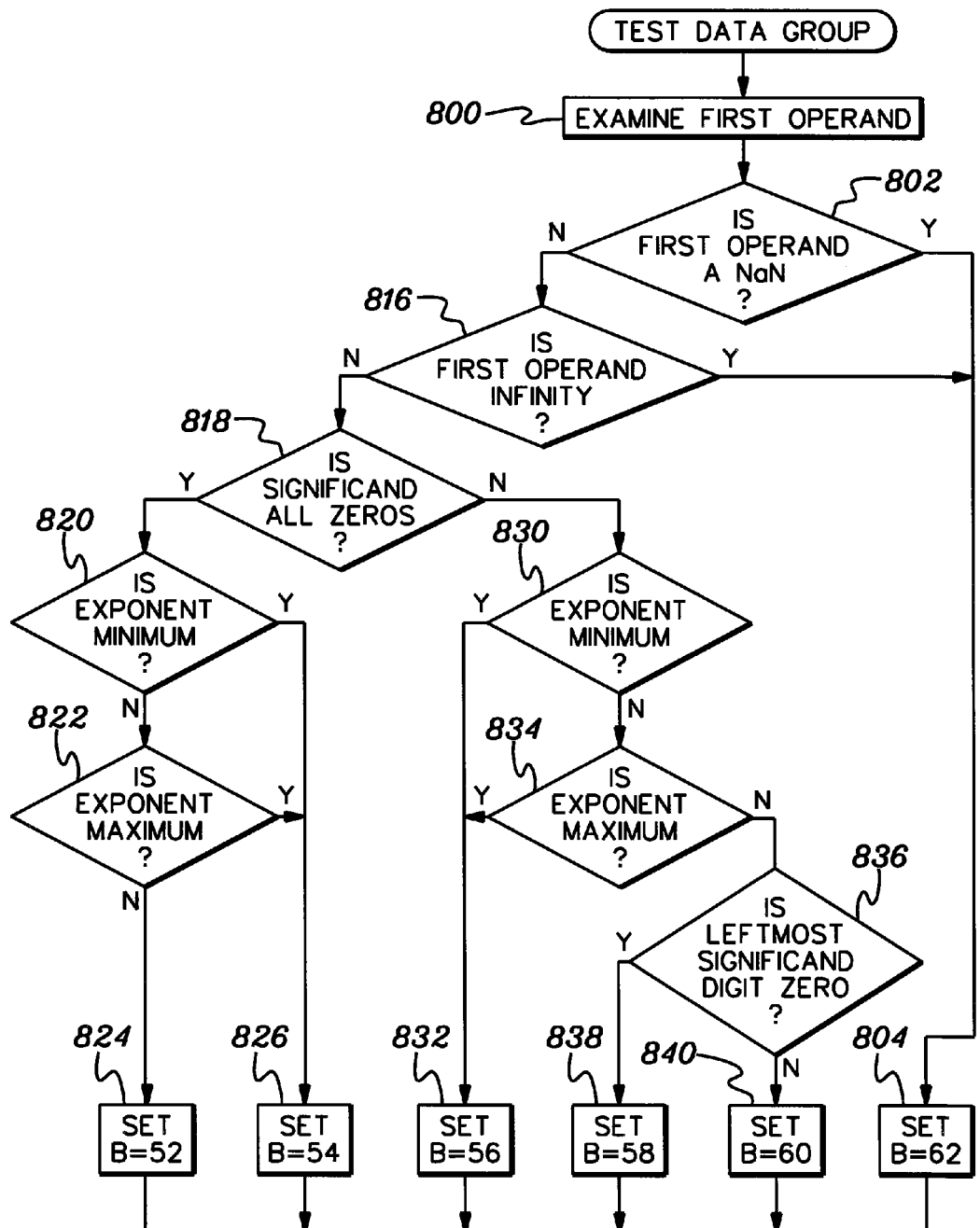
FIGS. 8A-8B depict one embodiment of the logic associated with executing the Test Data Group instruction, in accordance with an aspect of the present invention.

Referring to FIG. 8A, in one embodiment, responsive to executing the Test Data Group instruction, the first operand of the instruction is examined to determine the group and sign of the first operand (e.g., a decimal floating point number), STEP 800. For instance, a determination is made as to whether the first operand is a NaN, INQUIRY 802. If the first operand is a NaN, then a variable B is set equal to a number, such as 62 (e.g., corresponding to Group 6, Sign 0), in this example, STEP 804. The number represents the bit to be tested in the second operand address.

Figure 8B:
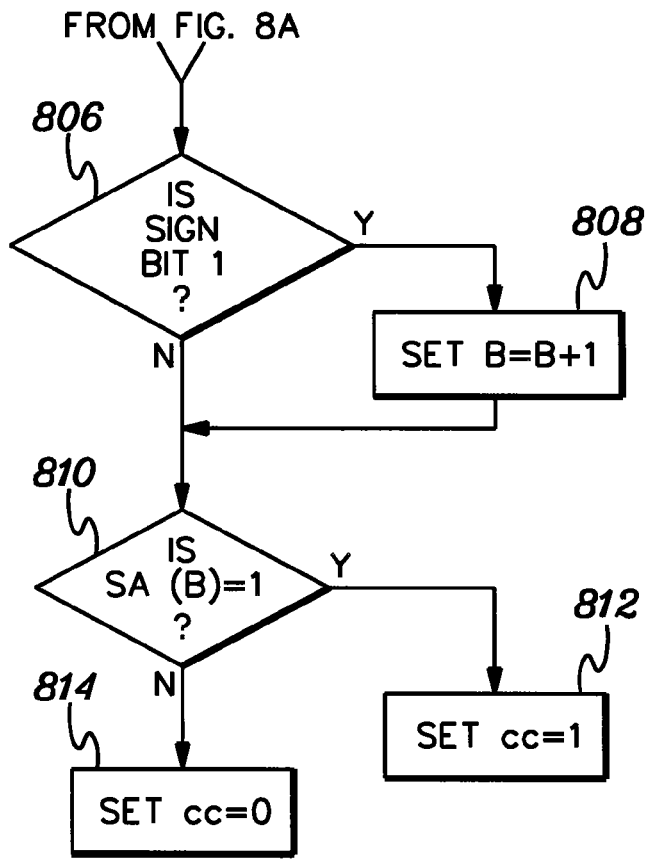

Thereafter, a determination is made as to whether the sign bit of the first operand is equal to one, INQUIRY 806 (FIG. 8B). If it is equal to one, then B is incremented by one, STEP 808. Thereafter, or if the sign bit is not equal to one (minus), then the bit in the second operand address (SA) corresponding to B is examined. If bit B of the second operand address (SA) is equal to one, INQUIRY 810, then the condition code is set equal to one, STEP 812. Otherwise, the condition code is set equal to zero, STEP 814.

Returning to INQUIRY 802 (FIG. 8A), if the first operand is not a NaN, then a further determination is made as to whether the first operand is infinity, INQUIRY 816. If the first operand is infinity, then processing continues with STEP 804, as described above. Otherwise, a further determination is made as to whether the significand of the operand is all zeros, INQUIRY 818. If the significand is all zeros, then a further check is made of the exponent. A determination is made as to whether the value of the exponent is equal to the defined minimum exponent, INQUIRY 820. If the exponent is not equal to the minimum, then a further determination is made as to whether it is equal to the defined maximum exponent, INQUIRY 822. If it is not equal to minimum or maximum, then B is set equal to, for instance, 52 (e.g., corresponding to Group 1, Sign 0), STEP 824, and processing continues with INQUIRY 806, as described above. Returning to INQUIRY 820, if the exponent is equal to minimum, INQUIRY 820, or maximum, INQUIRY 822, then B is set equal to a number, such as 54 (e.g., corresponding to Group 2, Sign 0), STEP 826, and processing continues with INQUIRY 806.

Returning to INQUIRY 818, if the significand is not all zeros, then a further determination is made as to whether the value of the exponent is equal to the defined minimum exponent, INQUIRY 830. If the exponent is equal to minimum, then B is set equal to, for instance, 56 (e.g., corresponding to Group 3, Sign 0), STEP 832, and processing continues with INQUIRY 806. On the other hand, if the exponent is not equal to minimum, then a further determination is made as to whether the exponent is equal to the defined maximum exponent, INQUIRY 834. If the exponent is equal to maximum, then B is set equal to 56 (e.g., corresponding to Group 3, Sign 0), STEP 832, in one example, and processing continues with INQUIRY 806. However, if the exponent is not equal to minimum or maximum, then a further determination is made as to whether the leftmost significand digit is zero, INQUIRY 836. If the leftmost significand digit is zero, then B is set equal to, for instance, 58 (e.g., corresponding to Group 4, Sign 0), STEP 838, and processing continues with INQUIRY 806. Otherwise, if the leftmost significand digit is nonzero, then B is set equal to 60 (e.g., corresponding to Group 5, Sign 0), STEP 840, as one example, and processing again continues with INQUIRY 806.

Processing of the Test Data Group instruction results in setting a condition code (cc). In some embodiments, the condition code is a field in a Program Status Word (PSW) register or other similar memory location, and in other embodiments, the condition code may be part of a different data structure or may be a freestanding data value. A condition code of zero indicates that there is no match to the event being tested and a condition code of one indicates there is a match.

One or more of the second operand address bits may be set to one indicating which conditions are considered safe for the user (or unsafe). For example, the user may deem that a floating point number resulting from a floating point operation is reliable or safe when in Group 4 (finite, nonzero, nonextreme, zero leftmost digit in significand). Therefore, in this example, the user sets bits 58 and 59 to 1. Then, during execution of the Test Data Group instruction, a selected bit is examined. If the bit is equal to 1 (a match), the result is safe, in this example. If it is not equal to one (no match), then the result is potentially unsafe. A result is said to be potentially unsafe if the result had not been determined to be safe and the result may not be safe, in which case additional testing may be able to determine if the result is safe or unsafe. Thus, in this example, if cc=1, the mainline application that invoked Test Data Group continues, as one example. Otherwise, the application branches out of the mainline to perform other testing, such as performance of the operation using a larger data format, or terminates, as examples.

Although, in the above example, the test is for safe and a 1 in a second operand address bit indicates safe, in another embodiment, a 0 or other value can represent safe. There are numerous possibilities and variations. For instance, there can be other definitions of safe. Thus, other conditions or characteristics can be considered safe and bits associated with those conditions are set. In a further example, a check can be made of non-safe conditions, in which a condition code of 1 (or other value) indicates a non-safe condition. One or more of the conditions can be tested and the decision of how to proceed depends on what is being tested and what actions are desired. The user can determine what is safe or unsafe based on its needs. Appropriate action is taken (e.g., branch, further testing, terminate, continue, etc.) based on the condition code.

Moreover, in a further embodiment, a plurality of bits can be tested. Again, many variations are possible.

The Test Data Group instruction can be issued after an operation that produces a decimal floating point result to quickly determine if the result is safe. For decimal floating point results that are finite numbers, the result is safe, as defined in this example, if using a wider data format by the operation would have produced the same value and quantum. In one embodiment, a safe result has two characteristics: (1) the exponent is neither the maximum exponent or the minimum exponent, and (2) the leftmost significand digit is zero. That is, the format in use still has room in both the exponent and the significand for expansion. In one example, the significand digits of a decimal floating point finite number are right aligned to support the concept of quantum. With the right alignment, a zero leftmost significand digit indicates room for significand expansion.

In this embodiment, if the result has the characteristics of the exponent being neither the maximum or minimum exponent and the leftmost significand digit is zero, then the result is indicated as safe. However, if the result does not have these characteristics, it will be indicated as unsafe. A result indicated as unsafe may in fact be safe, but closer scrutiny is needed, in this embodiment, to determine if it is actually safe or unsafe. For instance, the floating point operation could be re-performed with a larger data format to actually determine whether the previous result is safe.

In other embodiments, the characteristics may be selected such that only unsafe results are indicated as unsafe.

As examples, Test Data Group may be used to test whether a nonzero finite number is safe by setting bits 58 and 59 of the second operand address to ones (or another value). Further, Test Data Group may be used to test whether a nonzero finite number has reached the number of the format position, but not the limit of the format range, by setting bits 60 and 61 of the second operand address to ones (or another value). Subnormal with nonextreme exponent may be grouped with either the nonzero with extreme exponent group or the safe nonzero group.

The Test Data Group instruction provides a way to test an operand without risk of an exception or setting the IEEE flags. Operands including NaNs are examined without causing an IEEE exception.

The absence of an IEEE exception during a typical floating point operation does not indicate that the result that is a finite number is safe. For example, multiplying $100000 \times 10^3$ by $100000 \times 10^5$ produces $1000000 \times 10^{12}$ in the short format, but produces $10000000000 \times 10^8$ in a long format. These two results have the same value, but different quantum. This case can be detected by the Test Data Group instruction by specifying the nonzero leftmost significand digit with nonextreme exponent group. This case is not detected by any IEEE exceptions.

Figure 9:
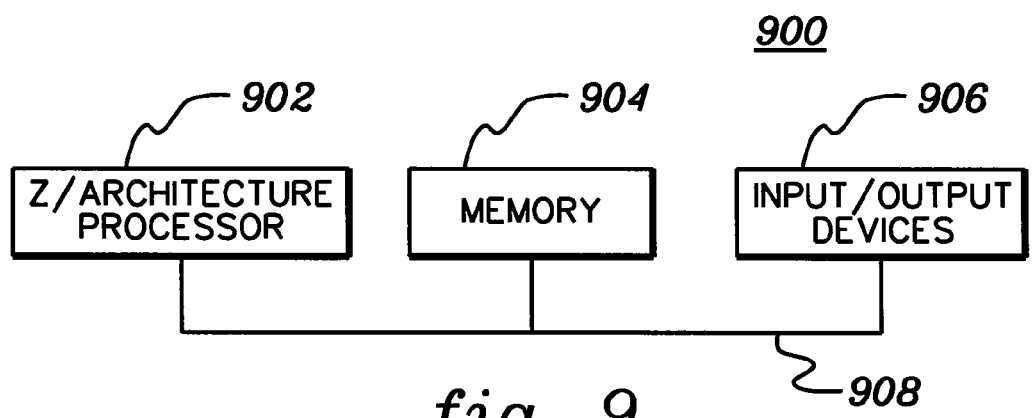
FIG. 9 depicts one embodiment of a processing environment to incorporate and use one or more aspects of the present invention.

In one embodiment, the Test Data Group instruction is executed by a processor of a processing environment. One embodiment of a processing environment to incorporate and use one or more aspects of the present invention is described with reference to FIG. 9. Processing environment 900 includes, for instance, a z/Architecture® processor 902 (e.g., a central processing unit (CPU)), a memory 904 (e.g., main memory), and one or more input/output (I/O) devices 906 coupled to one another via, for example, one or more buses 908 and/or other connections.

In the example shown, z/Architecture® processor 902 is a part of a System z™ server, offered by International Business Machines Corporation (IBM®), Armonk, N.Y. System z™ servers implement IBM's z/Architecture®, which specifies the logical structure and functional operation of the computer. The System z™ server executes an operating system, such as z/OS®, also offered by International Business Machines Corporation. IBM® and z/OS® are registered trademarks of International Business Machines Corporation, Armonk, N.Y., USA. Other names used herein may be registered trademarks, trademarks or product names of International Business Machines Corporation or other companies.

In another embodiment, the instruction and/or the logic of the instruction can be executed in a processing environment that is based on one architecture (which may be referred to as a "native" architecture), but emulates another architecture (which may be referred to as a "guest" architecture). In such an environment, for example, the Test Data Group instruction and/or logic thereof, which is specified in the z/Architecture® and designed to execute on a z/Architecture® machine, is emulated to execute on an architecture other than the z/Architecture®. One example of this processing environment is described with reference to FIGS. 10-11.

Figure 10:
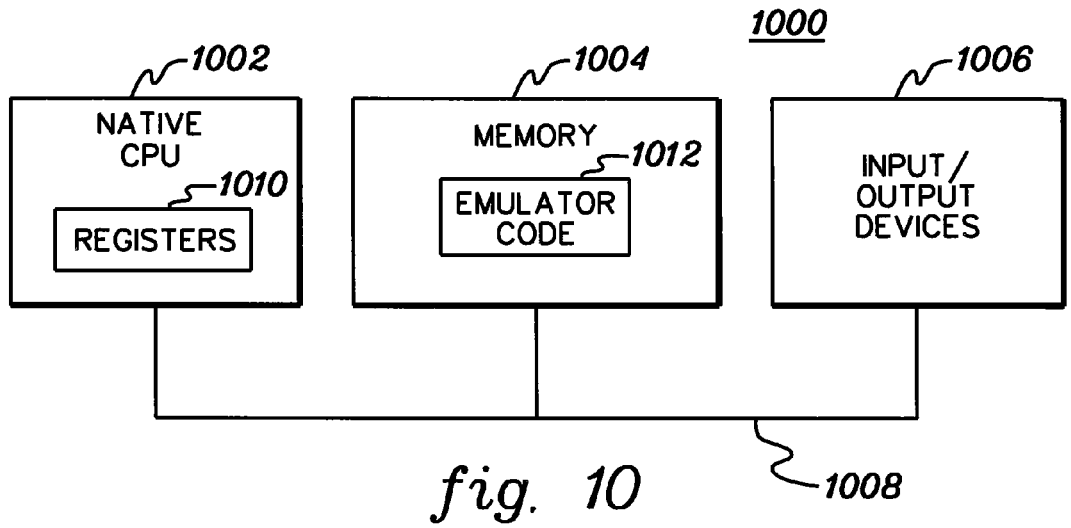
FIG. 10 depicts another embodiment of a processing environment to incorporate and use one or more aspects of the present invention.

Referring to FIG. 10, one embodiment of a processing environment to incorporate and use one or more aspects of the present invention is described. Processing environment 1000 includes, for instance, a native central processing unit 1002, a memory 1004 (e.g., main memory) and one or more input/output (I/O) devices 1006 coupled to one another via, for example, one or more buses 1008 and/or other connections. As examples, processing environment 1000 may include a Power PC® processor, a pSeries® server, or an xSeries® server offered by International Business Machines Corporation, Armonk, N.Y.; an HP Superdome with Intel® Itanium® 2 processors offered by Hewlett-Packard Company, Palo Alto, Calif.; and/or other machines based on architectures offered by IBM®, Hewlett-Packard, Intel®, Sun Microsystems or others. Power PC®, pSeries® and xSeries® are registered trademarks of International Business Machines Corporation, Armonk, N.Y., U.S.A. Intel® and Itanium® 2 are registered trademarks of Intel Corporation, Santa Clara, Calif.

Native central processing unit 1002 includes one or more native registers 1010, such as one or more general purpose registers and/or one or more special purpose registers, used during processing within the environment. These registers include information that represent the state of the environment at any particular point in time.

Moreover, native central processing unit 1002 executes instructions and code that are stored in memory 1004. In one particular example, the central processing unit executes emulator code 1012 stored in memory 1004. This code enables the processing environment configured in one architecture to emulate another architecture. For instance, emulator code 1012 allows machines based on architectures other than the z/Architecture®, such as Power PC® processors, pSeries® n servers, xSees® servers, HP Superdome® servers, or others to emulate the z/Architecture® and to execute software and instructions developed based on the z/Architecture®.

Figure 11:
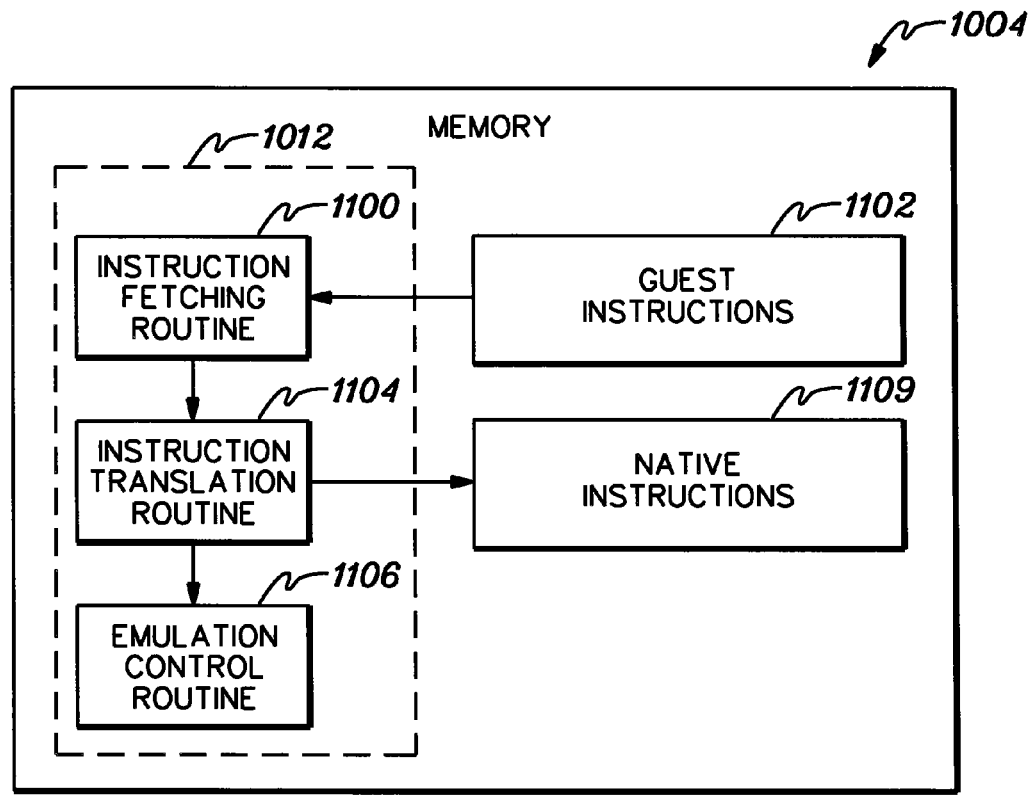
FIG. 11 depicts further details of the memory of FIG. 10, in accordance with an aspect of the present invention.

Further details relating to emulator code 1012 are described with reference to FIG. 11. Guest instructions 1102 comprise software instructions (e.g., machine instructions) that were developed to be executed in an architecture other than that of native CPU 1002. For example, guest instructions 1102 may have been designed to execute on z/Architecture® processor 902, but are instead being emulated on native CPU 1002 (which may be for example an Intel® Itanium® 2 processor). In one example, emulator code 1012 includes an instruction fetching routine 1100 to obtain one or more guest instructions 1102 from memory 1004, and to optionally provide local buffering for the instruction obtained. It also includes an instruction translation routine 1104 to determine the type of guest instruction that has been obtained and to translate the guest instruction into one or more corresponding native instructions 1109. This translation includes, for instance, identifying the function to be performed by the guest instruction and choosing the native instructions to perform that function.

Further, emulator 1012 includes an emulation control routine 1106 to cause the native instructions to be executed. Emulation control routine 1106 may cause native CPU 1002 to execute a routine of native instructions that emulate one or more previously obtained guest instructions and, at the conclusion of such execution, to return control to the instruction fetch routine to emulate the obtaining of the next guest instruction or group of guest instructions. Execution of the native instructions 1109 may include loading data into a register from memory 1004; storing data back to memory from a register; or performing some type of arithmetic or logical operation, as determined by the translation routine.

Each routine is, for instance, implemented in software, which is stored in memory and executed by the native central processing unit 1002. In other examples, one or more of the routines or operations are implemented in firmware, hardware, software or some combination thereof. The registers of the emulated guest processor may be emulated using the registers 1010 of the native CPU or by using locations in memory 1004. In embodiments, the guest instructions 1102, native instructions 1109, and emulation code 1012 may reside in the same memory or may be dispersed among different memory devices.

In one example, a guest instruction 1102 that is obtained, translated and executed is the Test Data Group instruction or similar instruction. The Test Data Group instruction, which is a z/Architecture® instruction in this example, is fetched from memory, translated and represented as a sequence of native instructions 1109 (e.g., Power PC®, pSeries®, xSeries®, Intel®, etc.) which are executed.

In another embodiment, a Test Data Group instruction is executed in another architecture environment including, for example, an architecture as described in the "INTEL® 64 and IA-32 Architectures Software Developer's Manual Volume 1," Order Number 253665-022US, November 2006; "INTEL® 64 and IA-32 Architectures Software Developer's Manual Volume 2A," Order Number 253666-022US, November 2006; the "INTEL® Itanium® Architecture Software Developer's Manual Volume 1," Doc. No. 245317-005, January 2006; the "INTEL® Itanium® Architecture Software Developer's Manual Volume 2," Doc. No. 245318-005, January 2006; and/or the "INTEL® Itanium® Architecture Software Developer's Manual Volume 3," Doc. No. 245319-005, January 2006; each of which is hereby incorporated herein by reference in its entirety.

In this embodiment, a "DFP FAXM instruction is executed that is similar to the Intel® FAXM-ExamineModeR/M instruction as described, for example, in section 8.1.3.3 and 8.3.6 in the "INTEL® 64 and IA-32 Architectures Software Developer's Manual Volume 1" and FXAM-Examine Mode starting on page 3-409 of "INTEL® 64 and IA-32 Architectures Software Developer's Manual Volume 2A". The DFP FAXM instruction, when executed examines the contents of the ST(0) register, for example, and sets bits of the FPU Status word (preferably the condition code flags C1, C2, and C3) to indicate the DFP Group of the contents of ST(0). The example table below showing condition code setting is only one encoding that might be contemplated. Furthermore, the groups reported in condition codes may differ from those shown in the table. For example, the sign of the contents of ST(0) is preferably encoded in the DFP FPU status word as well. Therefore, any combination of FPU status word bits my be used to report the DFP group of ST(0).

|  | Group | | |
|---|---|---|---|
|  | C3 | C2 | C1 |
| zero with non-extreme exponent | 0 | 0 | 1 |
| zero with extreme exponent | 0 | 1 | 0 |
| subnormal (or normal with extreme exponent) | 0 | 1 | 1 |
| Normal with non-extreme exponent and leftmost zero digit in coefficient | 1 | 0 | 0 |
| Normal with non-extreme exponent and leftmost nonzero digit in coefficient | 1 | 0 | 1 |
| special symbol (infinity, QNaN, or SNaN) | 1 | 1 | 0 |

In another embodiment an instruction similar to fclass found, for example, beginning at page 3:59 in the "INTEL® Itanium® Architecture Software Developer's Manual Volume 3" would test a value in a floating point register for an instruction specified DFP group. The result of the test would be stored, for example, in a pair of predicate registers p1 and p2. Optionally, the signed group might be tested and the results stored in predicate registers. In another option, a boolean operation might be performed on the groups to devise a group test.

In a variation of the embodiment, DFP compare instructions similar to any of the INTEL® instructions FCOM/FCOMP/FUCOMPP, FICOM/FICOMP, FCOMI/FCOMIP, FUCOMI/FUCOMIP may also test the data group of an operand, for instance, a source operand and set bits of the FPU Status word accordingly, either the condition code bits or other bits.

Any of the embodiments may employ a special DFP FPU Status word rather than share the FPU status word of the non-DFP function.

In yet a further embodiment, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a system (e.g., computer system) or sold separately.

Figure 12:
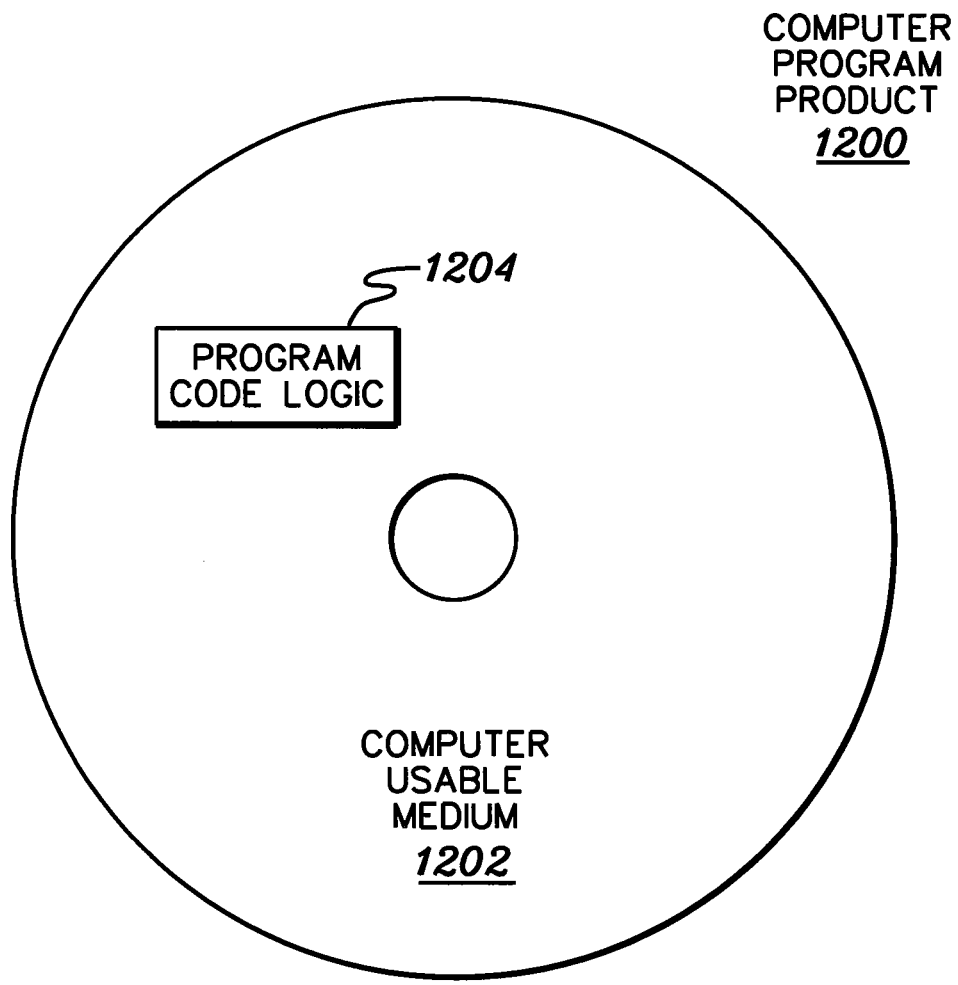
FIG. 12 depicts one example of a computer program product to incorporate one or more aspects of the present invention.

One example of an article of manufacture or a computer program product incorporating one or more aspects of the present invention is described with reference to FIG. 12. A computer program product 1200 includes, for instance, one or more computer usable media 1202 to store computer readable program code means or logic 1204 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided for facilitating detection of whether a value resulting from a decimal floating point operation is reliable or safe. In one embodiment, this capability includes an instruction that is invoked from an application, in response to obtaining a value from a floating point operation that is to be tested. Based on the results of the instruction, action is taken, such as continuing with the mainline application, terminating the mainline application, or branching to another application or routine, as examples.

Although one or more examples have been provided herein, these are only examples. Many variations are possible without departing from the spirit of the present invention. For instance, processing environments other than the examples provided herein may include and/or benefit from one or more aspects of the present invention. As an example, a processor can be other than an IBM System z™ processor and can execute an operating system other than z/OS®. Further, the environment need not be based on the z/Architecture®, but instead can be based on other architectures offered by, for instance, IBM®, Intel®, Sun Microsystems, as well as others. Yet further, the environment can include multiple processors, be partitioned, and/or be coupled to other systems, as examples.

Additionally, the instruction can include other registers or entities other than registers to designate information. Further, although examples of registers are described above, each of the registers may include more, less or different information. Further, each may include additional data not necessarily needed in one or more aspects of the present invention. Specific location within the registers for the information is implementation and/or architecture dependent. Yet further, different data and/or positioning within the registers and/or entities are possible.

Still further, one or more aspects of the present invention can be usable with other floating point systems, including variations on the decimal floating point described herein. One or more aspects of the present invention can be used with any floating point systems that include quantum, including hexadecimal or others. Further, the formats of decimal floating point numbers, as well as properties and any other characteristics, including but not limited to, the contents of the data formats may be different than described herein. A decimal floating point number can be defined as having more, less or different components than described herein; definitions can vary; and/or there can be more, less or different formats.

Moreover, although in the logic of Test Data Group, B is set equal to one of a set of particulars numbers, other numbers or entities may be used. Further the tests can be performed in differing order. Additionally, more, less and/or different tests can be performed. There can be more, less or different combinations of data group and sign. Many other variations are possible without departing from the spirit of the present invention. Further, the logic of Test Data Group can be performed without invoking an instruction.

In one embodiment, the group is indicated separately from the sign by electing to set condition codes based only on group or based only on sign for example.

Moreover, one or more aspects of the present invention also apply to implementations using BID (Binary Encoded Decimal Floating Point data) encoding, as well as other encoding.

In an embodiment wherein the significand is Binary Encoded Decimal (BID) format rather than DPD, the BID significand is decoded to a decimal value, such as packed decimal, for example, such that each decimal digit is represented by a distinct 4 bit value. The decimal value is operated on according to the function required and the result is re-encoded into the BID format, thereby the BID significand is operated on as a decimal number rather than a binary number. In one example, the function required is a shift operation on the significand. The shift operation is performed on the decimal number such that the value of the decimal number is shifted by a predetermined number of decimal digit positions. The shifted value is then encoded into BID format and saved as a result operand.

Additional details regarding decimal floating point are described in "Round For Reround Mode In Decimal Floating Point Instruction," U.S. Ser. No. 11/680,894, filed Mar. 1, 2007, which is hereby incorporated herein by reference in its entirety.

As used herein, the term "obtaining" as in, for instance, "obtaining an instruction" includes, but is not limited to, fetching, receiving, having, providing, being provided, creating, developing, etc.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention, and these are, therefore, considered to be within the scope of the invention as defined in the claims.

What is claimed is:

1. A computer program product for executing a machine instruction in a central processing unit, the machine instruction being defined for computer execution according to a computer architecture, the machine instruction comprising an opcode, a first register field, a second register field, an index field, a base field and a displacement value, the machine instruction for performing a determining function, the computer program product comprising: a non-transitory computer readable medium readable by a processor and storing instructions for execution by the processor for performing a method comprising:

performing a function defined by the opcode of the machine instruction of determining whether a first operand included in a register specified by the register field is a safe decimal floating point number or is a potentially unsafe decimal floating point number, said function comprising:

determining a data group and a sign for the first operand;
determining a plurality of second operand bits using the index field, base field and displacement value of the machine instruction, each bit of the plurality of second operand bits corresponding to a data group and sign combination;
selecting a bit of the plurality of second operand bits based on the data group and sign determined for the first operand;
determining a value of the selected bit; and
setting a condition code based on the value of the selected bit, the condition code indicating whether a result of a floating point operation is safe or potentially unsafe.

2. The computer program product of claim 1, wherein the register specified by the register field comprises a floating point register.

3. The computer program product of claim 1, wherein the determining the plurality of second operand bits comprises adding the contents of a register specified by the index field, the contents of a register specified by the base field, and the displacement value to obtain the plurality of second operand bits.

4. The computer program product of claim 3, wherein the result of adding the contents of a register specified by the index field, the contents of a register specified by the base field, and the displacement value comprises 64 bits, and wherein bits 0-51 are ignored, the plurality of second operand bits comprise bits 52-63, and wherein each bit of bits 52-63 corresponds to a particular data group and sign combination.

5. The computer program product of claim 4, wherein:

bit 52 corresponds to a data group having the characteristics of finite number, zero significand, and nonextreme exponent, and to a sign of positive;

bit 53 corresponds to a data group having the characteristics of finite number, zero significand, and nonextreme exponent, and to a sign of negative;

bit 54 corresponds to a data group having the characteristics of finite number, zero significand, and extreme exponent, and to a sign of positive;

bit 55 corresponds to a data group having the characteristics of finite number, zero significand, and extreme exponent, and to a sign of negative;

bit 56 corresponds to a data group having the characteristics of finite number, nonzero significand, and extreme exponent, and to a sign of positive;

bit 57 corresponds to a data group having the characteristics of finite number, nonzero significand, and extreme exponent, and to a sign of negative;

bit 58 corresponds to a data group having the characteristics of finite number, nonzero significand, nonextreme exponent, and zero leftmost digit in the significand, and to a sign of positive;

bit 59 corresponds to a data group having the characteristics of finite number, nonzero significand, nonextreme exponent, and zero leftmost digit in the significand, and to a sign of negative;

bit 60 corresponds to a data group having the characteristics of finite number, nonzero significand, nonextreme exponent and nonzero leftmost digit in the significand, and to a sign of positive;

bit 61 corresponds to a data group having the characteristics of finite number, nonzero significand, nonextreme exponent and nonzero leftmost digit in the significand, and to a sign of negative;

bit 62 corresponds to a data group having the characteristics of infinity or not a number, and to a sign of positive; and bit 63 corresponds to a data group having the characteristics of infinity or not a number, and to a sign of negative.

6. The computer program product of claim 1, wherein the condition code indicates whether characteristics of a value specified in the first operand match one or more selected conditions.

7. The computer program product of claim 6, wherein a match indicates the value is safe or potentially unsafe depending on the selected conditions.

8. The computer program product of claim 1, wherein the machine instruction comprises 48 bits, and wherein the opcode comprises bit 0-7 and 40-47, the register field comprises bits 8-11, the index field comprises bits 12-15, the base field comprises bits 16-19, and the displacement field comprises bits 20-31.

9. The computer program product of claim 1, wherein the computer architecture is the IBM® z/Architecture, and wherein the machine instruction has an RXE format according to the IBM® z/Architecture.

10. The computer program product of claim 1, wherein safe indicates that use of a larger data format would not produce a different value or quantum.

11. The computer program product of claim 1, wherein the computer readable program code logic is emulator code.

* * * * *